United States Patent [19]

Herzberg et al.

[11] Patent Number: 5,337,311
[45] Date of Patent: Aug. 9, 1994

[54] APPARATUS FOR CONNECTING TWO FIBER DISTRIBUTED DATA INTERFACE RINGS

[75] Inventors: Louis P. Herzberg, Monsey; Baiju V. Patel, Mt. Kisco; Antonio Ruiz, Yorktown Heights; Frank A. Schaffa, Ossining; Marc H. Willebeek-LeMair, Mt. Kisco, all of N.Y.

[73] Assignee: International Business Machines Corporation, Armonk, N.Y.

[21] Appl. No.: 997,796

[22] Filed: Dec. 29, 1992

[51] Int. Cl.[5] ............................................. H04J 3/02
[52] U.S. Cl. ................................... 370/85.14; 370/85.7
[58] Field of Search ............... 370/85.4, 85.5, 85.1, 370/85.7, 85.15, 85.13, 85.14, 85.12, 68, 95.1, 79, 85.2, 85.6; 340/825.05, 825.5, 825.51

[56] References Cited

U.S. PATENT DOCUMENTS

| | | | |
|---|---|---|---|
| 4,587,651 | 5/1986 | Nelson et al. | 370/68 |
| 5,051,986 | 9/1991 | Grow et al. | 370/85.5 |
| 5,191,580 | 3/1993 | Nakano et al. | 370/85.5 |

OTHER PUBLICATIONS

Hawe et al., "Transparent Interconnection of Local Networks with Bridges", Advances in LAN, IEEE Press, 1987, p. 489.

Murata et al., "Performance Analysis of Token Ring Networks with Reservation Priority Discipline", Oct. 1990, pp. 1844–1845, IEEE Transaction on Communications.

*Primary Examiner*—Douglas W. Olms
*Assistant Examiner*—Huy D. Vu
*Attorney, Agent, or Firm*—Whitham, Curtis & Whitham

[57] ABSTRACT

In standard token-based LANs (e.g., FDDI, Token Ring) an equal share of the ring bandwidth is made available to each node. Certain nodes (e.g., bridges, routers, servers) require a larger representation (bandwidth) than other nodes. A surrogate (bridge/router) node is presented which achieves this in a standard compliant manner. The bridge/router may serve as a surrogate on each ring representing multiple stations from the other ring. The multiplicity of stations is adjusted either statically or dynamically to provide sufficient added bandwidth to the surrogate to reduce delay and packet loss characteristic of the conventional single station bridge or router. The increased bandwidth utilization and FDDI ring performance resulting from the implementation of this invention is transparent to the individual stations and the ring in a way that is advantageous to both single media and multimedia usages within defined network local and non-local areas.

8 Claims, 6 Drawing Sheets

APPARATUS FOR CONNECTING TWO FIBER DISTRIBUTED DATA INTERFACE RINGS

BACKGROUND OF THE INVENTION

1. Field of the Invention

The present invention generally relates to local area networks (LANs) and, more particularly, to networks using a timed token protocol and to internetworking devices on such networks, such as serves, bridges, and routers.

2. Description of the Prior Art

The interconnection and interoperation of distributed computing devices is an old but containing challenge. In recent years many of those who have thought about this challenge have concluded that the most effective way to promote progress is to parse the task into relatively independent but connected pieces and develop a corresponding set of standards. Different systems can then communicate if they follow the standards at their corresponding levels; they may rely upon parallel coordination through standards at other levels to complete the communication path. The Open Systems Interconnection (OSI) reference model reflects this view.

The OSI model defines seven layers—from the physical link dealing with mechanical, electrical and optical characteristics of signals to the application layer which provides file transfer and network management services to users. Local area network (LAN) standards within the OSI model are the subject matter and constraints for the present invention. Local area networks are characterized by a topology (e.g. ring or bus) for connecting devices to the LAN's signal transmission medium (e.g. cable or optical fiber) and a protocol (e.g. token-ring or timed-token) for controlling access to the medium by an attached device.

Communication capacity over a LAN is limited by the transmission medium, and also by the topology and the relevant protocols at both the physical and media access control levels. "Bandwidth" is a measure of the communication capacity of a LAN, and is commonly given in bits per second. For example, the bandwidth of a coaxial cable Ethernet LAN may be 10 million bits per second (Mbps) while a Fiber optic Distributed Data Interface (FDDI) LAN using a timed-token protocol may be 100 Mbps.

However, these figures are nominal capacities. Typically, the aggregate communication needs of devices attached to a LAN are an irregular mix of stream and bursty traffic. The LAN's capacity may be underutilized at one time and overloaded at another.

SUMMARY OF THE INVENTION

It is therefore an object of the present invention to provide fair representation of all the stations on each LAN across other LANs connected by a bridge/router, improving upon the representation that is provided by the MAC protocol to a single station, in conformance to Standards, without violating the applicable protocol.

A further object of the invention is to reduce the delay, buffering, and packet loss across a bridge/router.

It is also an object of the invention to provide more bandwidth to a server, bridge, or router than available to a single station on the LAN by acting as a surrogate on the LAN for all the stations connected to it.

A further object of the invention to increase throughput by circulating multiple token through different section of the network.

An additional object of the invention is to increase the chance of a successful transmission and to improve reliability.

The above objectives can be achieved by constructing a bridge/router such that it effectively behaves as one or more virtual stations on each of the LANs it connects to, as shown in FIG. 4. This may be based on the number of station on each LAN or the traffic pattern between LANs.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is an apparatus for interconnecting networks that utilize a token based protocol (e.g., Fiber optic Distributed Data Interface or FDDI) so as to increase the effective bandwidth available to a station, remaining in conformance with standards.

Figure 1:
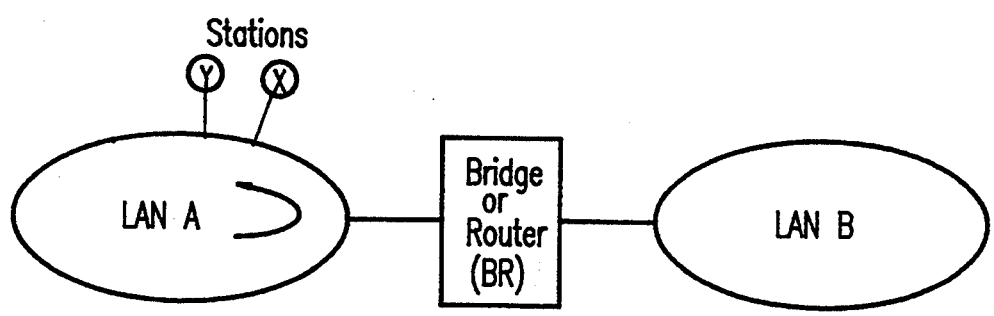
FIG. 1 is a block diagram showing a bridge or router interconnecting two LANs.

Bridges and routers have been used for establishing communication links between stations on different networks. A summary of prior art of bridges and routers is published in *IEEE Network Magazine*, January 1988, Vol. 2, No. 1, pp. 57–64, and in the *Handbook of Computer Communications Standards*, By W. Stallings, Vol. 2, pp. 207–234. These describe the operation of a bridge between two LANs, A and B, as shown in FIG. 1. This operation is summarized as follows:

Read all frames transmitted on A, and accept those addressed to stations on B.

Using the media access control protocol for B, retransmit the frames onto B.

Do the same for B-to-A traffic.

Figure 2:
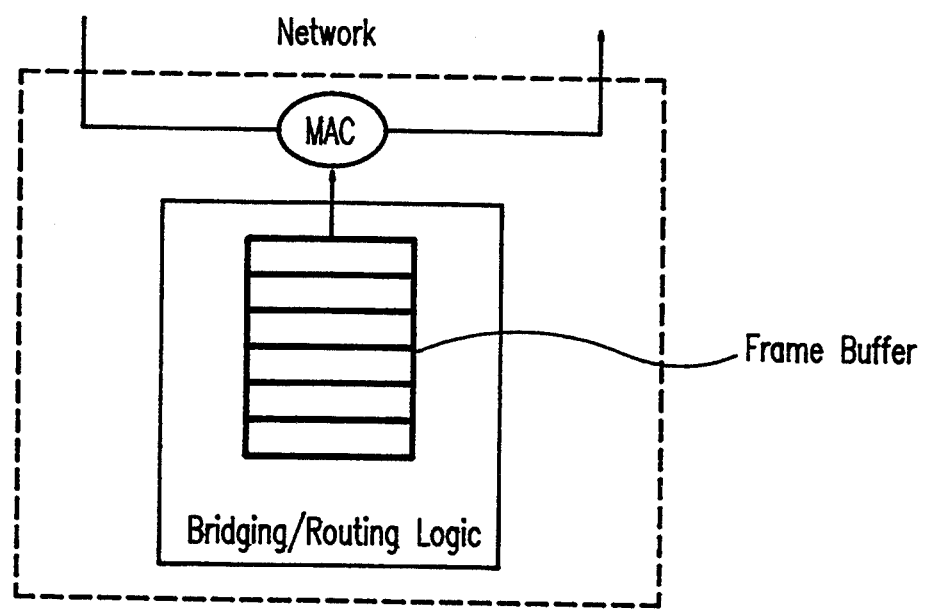
FIG. 2 is a block diagram showing the media access control (MAC) component of a conventional bridge or a router.

Over a short period of time, frames may arrive at the bridge faster then they can be transmitted. Each bridge is a single station on each of the networks that it connects to and transmits frames onto the network in accordance with a media access control (MAC) protocol. This is shown in FIG. 2.

The main difference between a router and a bridge is that the router reads only packets explicitly addressed to it and determines the LAN onto which it should be transmitted. Thus, as in the bridge case, frames may arrive faster than they can be transmitted. Moreover, a router is also a single station on each of the networks to which it is connected. A summary of the MAC protocols for various network standards is described in the *Handbook of Computer Communications Standards, supra*, Chapters 1–7.

Figure 3:
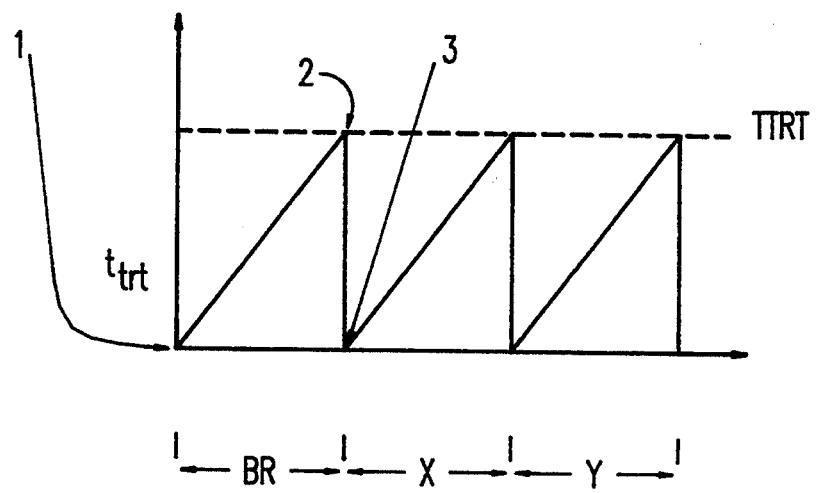
FIG. 3 is a graph showing bandwidth available to a conventional bridge/router using the timed token protocol.

Due to the fairness algorithms embedded in the timed-token protocol, the amount of time available to a bridge or a router (indicated by BR in FIG. 3) for transmission is the same as that for any other station on the LAN. For the network of FIG. 1, the time available for a conventional bridge/router to transmit data is shown in FIG. 3. At point 1 in FIG. 3, the bridge/router may start transmission of packets and can transmit for up to full target token rotation time (TTRT) (point 2 in FIG. 3), before releasing the token. Once the token goes around the ring, it may be captured by station X at point 3 in FIG. 3. Now, station X can transmit for up to a full TTRT, and so on.

The concept applies to a simple token-based protocol used in Token Ring networks. Therefore, for the example of FIG. 1, if LAN A is heavily loaded and there is considerable traffic from LAN B to LAN A, packets may be dropped by the bridge/router. The packets that are not dropped may encounter high delay. The packet loss and high delays are undesirable features of the bridge/router.

Figure 4:
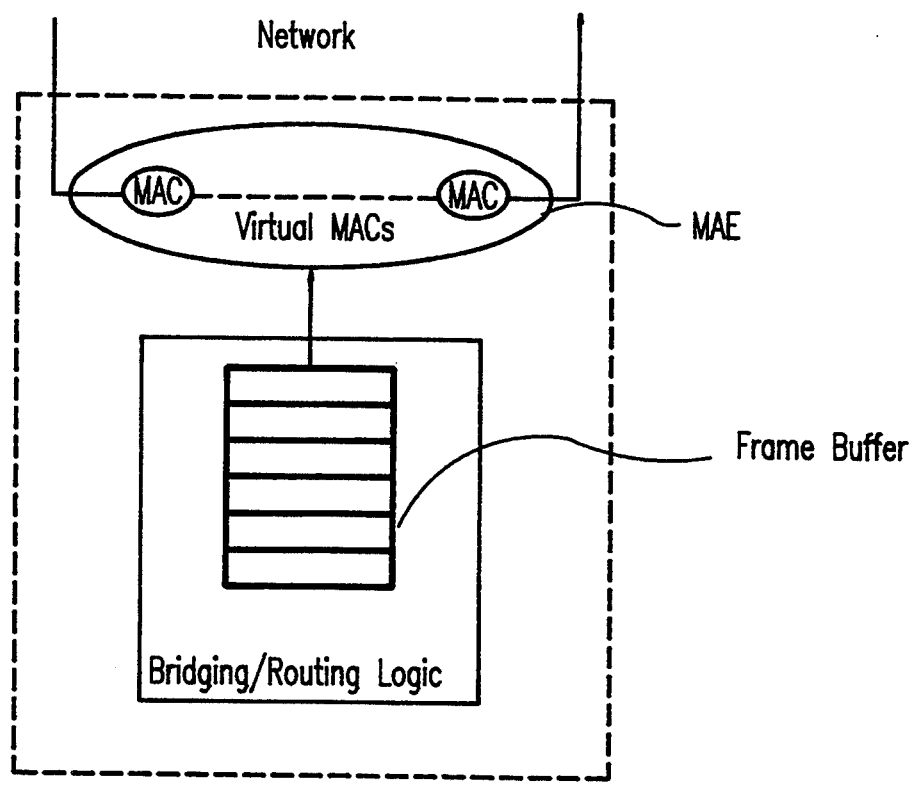
FIG. 4 is a block diagram showing a bridge/router with multiple virtual MACs in accordance with the invention.
Figure 5:
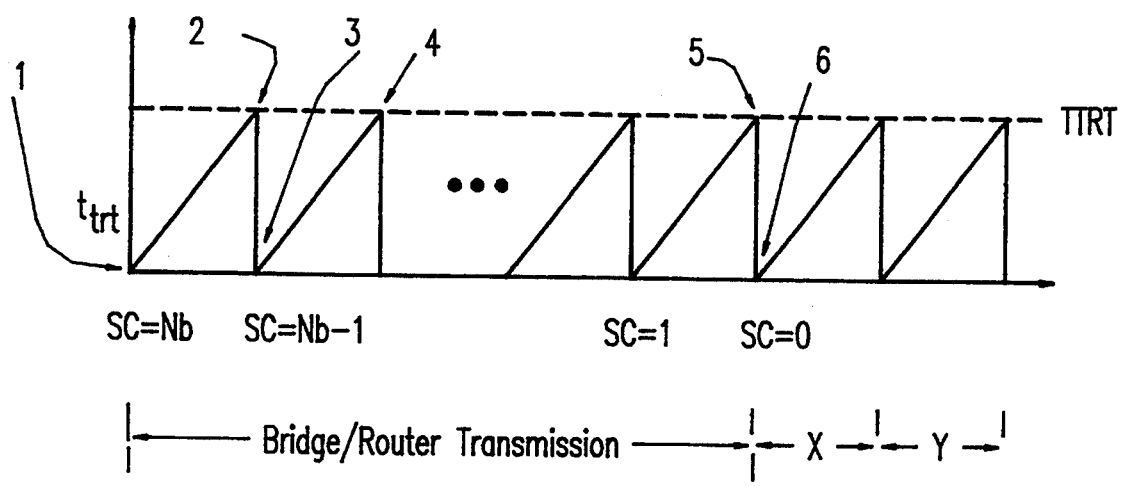
FIG. 5 is a graph showing bandwidth available to bridge/router using multiple virtual MACs.

For example, in the network of FIG. 1, if LAN A has $N_A$ stations and LAN B has $N_B$ stations, the bridge/router will act as if it is $N_B$ virtual stations on LAN A and $N_A$ virtual stations on LAN B, as illustrated in FIG. 4. Thus, the bandwidth available to station X on LAN A for transmission to LAN B over the bridge/router will be the same as if the station X was on LAN B. This is exemplified in FIG. 5, where the bridge/router has $N_B*TTRT$ seconds of transmission time on LAN A while other stations (station X in FIG. 1) have only TTRT seconds transmission time (out of $(N_A+N_B)*TTRT$ seconds).

Figure 6:
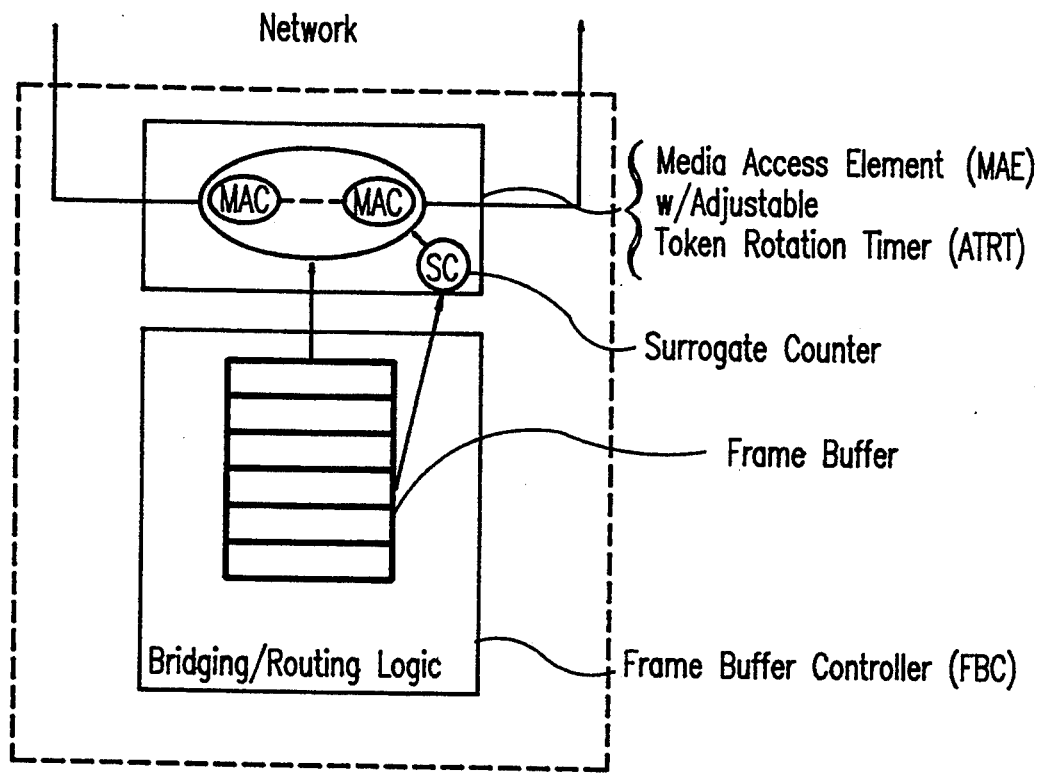
FIG. 6 is a block diagram of the apparatus that implements virtual MACs.

The ring interface of such an apparatus, as shown in FIG. 6, comprises:

1. A Surrogate Counter (SC). The number of virtual stations that the bridge/router represents is given by $SC_{max}$. The SC counter indicates the number of virtual stations available for data transmission. The counter is decremented at each capture of the token followed by a transmission. Once the bridge forwards a token without capturing it (no data to be transmitted), the counter SC is reset to $SC_{max}$.
2. A Media Access Element (MAE) with an Adjustable Token Rotation Timer (ATRT). This element captures the token and transmits frames until either the Token Rotation Timer expires, or it no longer has data (whichever occurs first). By controlling the Token Rotation Timer, this element can be made to behave as a multiplicity of stations by allowing it to capture the token on successive token rotations before giving a downstream neighbor a chance to send (this only affects asynchronous traffic). Upon expiration of the Token Rotation Timer, the token is released, and the Timer is reset if the Surrogate Counter is greater than 1 and there is still data in the Data Buffer.
3. The Frame Buffer Controller (FBC). The status of the Frame Buffer is used to set the Surrogate Counter in order to dictate how many stations the MAE is to represent.

The method for dynamic determination of the maximum value for the Surrogate Counter $SC_{max}$ is as follows, with reference to FIG. 6:

1. The FBC measures the quantity of data to be transmitted and forwards this estimate to the MAE.
2. The MAE can now set $SC_{max}$ to as many virtual MAC entities as are required and place them in the token path in order to increase the token acquisition opportunities on the ring and expedite the transmission of the data in the Frame Buffer.

A static determination of the maximum value for the Surrogate Counter $SC_{max}$ can be achieved by identifying the number of stations connected to each LAN using Station Management (SMT) capability and using a fraction of the number of stations to set the value of $SC_{max}$.

For FDDI, this apparatus is especially desirable within a bridge/router where several stations on one side of the bridge/router are represented on the opposite side ring through the bridge/router. Those stations being represented by the bridge/router will appear, to all other stations on the ring, as though they are physically attached to the ring. Consequently, the bridge/router has bandwidth available for all the stations that it connects to (represents). However, it does not have to incur the costs of true physical connections that the additional attachments would require if they actually were attached to the ring (e.g., latency, BER, etc.).

These stations can be represented virtually by simple manipulation of the bridge/router's MAC timer (ATRT-similar to the FDDI token rotation timer). A counter, SC, must be initialized to the number of stations that are to be represented. When the Token arrives, the bridge/router behaves as the first station on the surrogate counter (SC) list (i.e., point 1 in FIG. 5). Using its MAC timer the bridge/router determines the amount of asynchronous bandwidth available and transmits data for that duration given by ATRT (until point 2 in FIG. 5). Once the timer expires the token is released and SC is decremented (point 2 in FIG. 5). If $SC>0$, then the bridge/router's ATRT timer is reset. Upon the next token rotation, the bridge/router may again capture the token as though it were the next station on the surrogate counter (SC) list (point 3 in FIG. 5). Once the ATRT timer expires (point 4 in FIG. 5) the token is released and SC is decremented, $SC=SC-1$. The ATRT timer will again be reset if $SC>0$. This will terminate when $SC=0$ (point 5 in FIG. 5) and the next station (X in FIG. 1) on the ring will have the opportunity to utilize the available asynchronous bandwidth (point 6 in FIG. 5). At this time, SC will be set to the number of stations the bridge/router represents ($SC_{max}$). By adjusting $SC_{max}$, any number of stations can be represented. In order to avoid violating the FDDI Standards, a surrogate should not represent more stations than are actually attached to the LAN.

The number of stations that a bridge/router represents may be adjusted statically or dynamically. For the static determination, using station management (SMT) capability of FDDI, the bridge/router will determine the exact number of stations on each of the LANs it connects to. Then, a predetermined fraction of that number (representative of the inter-LAN traffic) will be used to initialize the value of SC.

Alternately, the value of SC may be adjusted dynamically based on the state of the buffers in the bridge/router. Two threshold values, $T_H$ and $T_L$, may be used for the buffers. When the buffer occupancy exceeds $T_H$, $SC_{max}$ is incremented and when the buffer occupancy goes below $T_L$, $SC_{max}$ is decremented. The predetermined upper and lower bounds may be used to ensure certain service criteria (for example $SC_{max}$ should be at least one).

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a communication network employing a timed token protocol, an apparatus for adjusting an asynchronous bandwidth made available to a surrogate station operating in both first and second rings of stations, comprising:
 a surrogate counter having a prescribed value being a number of stations from said second ring represented on said first ring by said surrogate station, said surrogate counter being reset to said prescribed value when said surrogate station receives a token from said first ring and forwards the token without capturing it, said surrogate counter being decremented by one when said surrogate station forwards a token after capturing it, said surrogate counter being operatively coupled to said first and second rings of stations; and
 a media access element (MAE) having an adjustable token rotation timer (ATRT), said adjustable token rotation timer being reset when said surrogate station detects a token, said adjustable token rotation timer being reset again when said surrogate station forwards a token, if said surrogate counter is greater than zero.

2. In a communication network employing a timed token protocol, an apparatus for adjusting an asynchronous bandwidth made available to a surrogate station operating in both first and second rings of stations, comprising:
 a surrogate counter having a prescribed value being a number of stations from said second ring represented on said first ring by said surrogate station, said surrogate counter being reset to said prescribed value when said surrogate station receives a token from said first ring and forwards the token without capturing it, said surrogate counter being decremented by one when said surrogate station forwards a token after capturing it, said surrogate counter being operatively coupled to said first and second rings of stations; and
 a media access element (MAE) having an adjustable token rotation timer (ATRT), said adjustable token rotation timer being reset when said surrogate station detects a token, said adjustable token rotation timer being reset again when said surrogate station forwards a token, if said surrogate counter is greater than zero,
 said number of said stations represented being a predetermined fraction of the total number of stations on said second ring, said predetermined fraction being chosen so that said number of said stations represented is representative of communication traffic between said first ring and said second ring.

3. In a communication network employing a timed token protocol, an apparatus for adjusting an asynchronous bandwidth made available to a surrogate station operating in both first and second rings of stations, comprising:
 a surrogate counter having a prescribed value being a number of stations from said second ring represented on said first ring by said surrogate station, said surrogate counter being reset to said prescribed value when said surrogate station receives a token from said first ring and forwards the token without capturing it, said surrogate counter being decremented by one when said surrogate station forwards a token after capturing it, said surrogate counter being operatively coupled to said first and second rings of stations;
 a media access element (MAE) having an adjustable token rotation timer (ATRT), said adjustable token rotation timer being reset when said surrogate station detects a token, said adjustable token rotation timer being reset again when said surrogate station forwards a token, if said surrogate counter is greater than zero;
 a data buffer for storing overflow communication traffic between said first ring and said second ring;
 a high threshold value for the amount of data stored in said data buffer, such that, when said high threshold value is exceeded by an amount of data stored in said data buffer, said prescribed value of said surrogate counter is incremented; and
 a low threshold value, such that, when said low threshold value exceeds the amount of data stored in said data buffer, said prescribed value of said surrogate counter is decremented.

4. The apparatus according to claim 1, wherein said prescribed value is the number of stations from said second ring represented on said first ring by said surrogate station, said number of said stations represented being a predetermined fraction of the total number of stations on said second ring.

5. The apparatus according to claim 4, wherein said predetermined fraction is selected such that said number of said stations represented is representative of communication traffic between said first ring and said second ring.

6. The apparatus according to claim 1, further comprising a data buffer for storing overflow communication traffic between said first ring and said second ring.

7. The apparatus according to claim 6, further comprising a high threshold value for the amount of data stored in said data buffer, such that, when said high threshold value is exceeded by an amount of data stored in said data buffer, said prescribed value of said surrogate counter is incremented.

8. The apparatus according to claim 7, further comprising a low threshold value, such that, when said low threshold value exceeds the amount of data stored in said data buffer, said prescribed value of said surrogate counter is decremented.

* * * * *